US009881704B2

(12) United States Patent
Harris

(10) Patent No.: US 9,881,704 B2
(45) Date of Patent: Jan. 30, 2018

(54) CONTAINMENT VESSEL DRAIN SYSTEM

(71) Applicant: NuScale Power, LLC, Corvallis, OR (US)

(72) Inventor: Scott G. Harris, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 14 days.

(21) Appl. No.: 14/607,968

(22) Filed: Jan. 28, 2015

(65) Prior Publication Data
US 2016/0217875 A1    Jul. 28, 2016

(51) Int. Cl.
*G21C 15/02* (2006.01)
*G21C 13/02* (2006.01)

(52) U.S. Cl.
CPC ......... *G21C 15/02* (2013.01); *G21C 13/022* (2013.01); *Y02E 30/40* (2013.01)

(58) Field of Classification Search
CPC ......... Y02E 30/32; Y02E 30/40; G21C 15/16; G21C 13/00; G21C 15/182; G21C 17/00; G21C 13/024; G21C 15/00; G21C 15/18; G21D 1/02; Y10S 165/911; F22B 37/22; F22B 37/261; F22B 37/10; F22B 37/18
USPC ....... 376/371, 294, 377, 399, 403, 150, 267, 376/379, 384, 299, 367; 165/104.14, 81, 165/911
See application file for complete search history.

(56) References Cited

U.S. PATENT DOCUMENTS

| | | | | |
|---|---|---|---|---|
| 558,660 | A * | 4/1896 | Reissing ............... | F24F 5/0035 137/212 |
| 2,707,967 | A * | 5/1955 | Adams et al. ................ | 137/212 |
| 2,998,363 | A * | 8/1961 | Blaser ..................... | G21C 1/08 122/41 |
| 3,115,450 | A * | 12/1963 | Schanz .................... | G21C 9/00 250/515.1 |

(Continued)

FOREIGN PATENT DOCUMENTS

| CN | 104112482 A | 10/2014 |
|---|---|---|
| GB | 10752AAD1911 | 0/1911 |

(Continued)

OTHER PUBLICATIONS

Listing of Related Cases; May 16, 2016.
(Continued)

*Primary Examiner* — Sean P Burke
(74) *Attorney, Agent, or Firm* — Schwabe Williamson & Wyatt

(57) ABSTRACT

A system for draining a containment vessel may include a drain inlet located in a lower portion of the containment vessel. The containment vessel may be at least partially filled with a liquid, and the drain inlet may be located below a surface of the liquid. The system may further comprise an inlet located in an upper portion of the containment vessel. The inlet may be configured to insert pressurized gas into the containment vessel to form a pressurized region above the surface of the liquid, and the pressurized region may operate to apply a surface pressure that forces the liquid into the drain inlet. Additionally, a fluid separation device may be operatively connected to the drain inlet. The fluid separation device may be configured to separate the liquid from the pressurized gas that enters the drain inlet after the surface of the liquid falls below the drain inlet.

19 Claims, 10 Drawing Sheets

(56) References Cited

U.S. PATENT DOCUMENTS

| | | | | |
|---|---|---|---|---|
| 3,255,089 | A | * | 6/1966 | Deighton ............... G21C 1/326 376/289 |
| 3,547,778 | A | * | 12/1970 | Ott ........................ G21D 7/04 136/202 |
| 3,865,688 | A | | 2/1975 | Kleimola |
| 4,092,490 | A | * | 5/1978 | Schabert ............. G21C 13/036 376/292 |
| 4,246,069 | A | | 1/1981 | Dupuy |
| 4,466,253 | A | * | 8/1984 | Jaster ..................... F22B 3/045 60/686 |
| 4,647,425 | A | * | 3/1987 | Battaglia ................ G21C 19/30 376/308 |
| 4,753,771 | A | * | 6/1988 | Conway ................. G21C 15/18 376/282 |
| 5,271,051 | A | * | 12/1993 | Corletti ................. G21C 19/07 376/272 |
| 5,511,102 | A | * | 4/1996 | Gluntz ................... G21C 15/18 376/283 |
| 6,243,432 | B1 | * | 6/2001 | Cheung ................. G21C 9/004 376/282 |
| 6,463,819 | B1 | | 10/2002 | Rago |
| 7,669,693 | B2 | * | 3/2010 | Yamaguchi ............. F01N 1/02 181/249 |
| 8,537,959 | B2 | * | 9/2013 | Akinaga ................ G21C 9/016 376/277 |
| 9,206,978 | B2 | | 12/2015 | Evans et al. |
| 2003/0048865 | A1 | * | 3/2003 | Cheung ................. G21C 9/012 376/283 |
| 2004/0017877 | A1 | | 1/2004 | Hartel |
| 2007/0076835 | A1 | * | 4/2007 | Tobimatsu ............. G21C 9/004 376/280 |
| 2007/0121776 | A1 | * | 5/2007 | Pao ........................ G21C 19/00 376/305 |
| 2009/0129530 | A1 | * | 5/2009 | Reyes, Jr. ................ G21C 1/32 376/282 |
| 2009/0129531 | A1 | * | 5/2009 | Reyes, Jr. .............. G21C 19/00 376/299 |
| 2013/0259183 | A1 | * | 10/2013 | Sato ....................... G21C 1/086 376/283 |
| 2013/0336440 | A1 | * | 12/2013 | Memmott ................ G21C 9/00 376/282 |
| 2014/0205051 | A1 | * | 7/2014 | Harkness ............. G21C 15/18 376/282 |

FOREIGN PATENT DOCUMENTS

| JP | S63 165798 A | 7/1988 |
|---|---|---|
| WO | 2010/150285 A2 | 12/2010 |

OTHER PUBLICATIONS

International Search Report and Written Opinion for PCT/US2016/030013 dated Oct. 18, 2016; 20 pages.
International Search Report and Written Opinion for PCT/US2015/060144 dated Jun. 23, 2016; 20 pages.

* cited by examiner

CONTAINMENT VESSEL DRAIN SYSTEM

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods for draining a containment vessel, such as a containment vessel in a nuclear reactor system.

BACKGROUND

Reactor modules, such as nuclear reactor modules, may be configured to operate in and/or be subjected to a variety of different conditions. These operating conditions may include a wide range of pressures, temperatures, and/or other types of environmental conditions. For example, a number of reactor module components may be submerged in water, or may be exposed to chemicals and/or high levels of radiation. Additionally, performing maintenance on the reactor module may involve shutting down normal operation of the reactor module for an extended period of time. When a typical reactor module is shutdown, it is unable to generate power or electricity. Accordingly, the reactor module should be designed to be a robust system capable of operating within the environmental conditions and while requiring minimal downtime for repair, inspection, maintenance, or refueling.

Reactor modules which are configured to operate in a wet environment, such as where one or more components or structures are located within and/or exposed to water, may provide additional challenges during various operations or procedures associated with the reactor module. For example, one or more components may be exposed to water or water vapor during a maintenance operation. While it may be acceptable that the one or more components are exposed to certain environmental conditions during some types of operations, or for a limited period of time, the exposure to the environmental conditions may not be acceptable during other operations, such as during a startup operation or while the reactor module is generating power.

The present invention addresses these and other problems.

DETAILED DESCRIPTION

Figure 1:
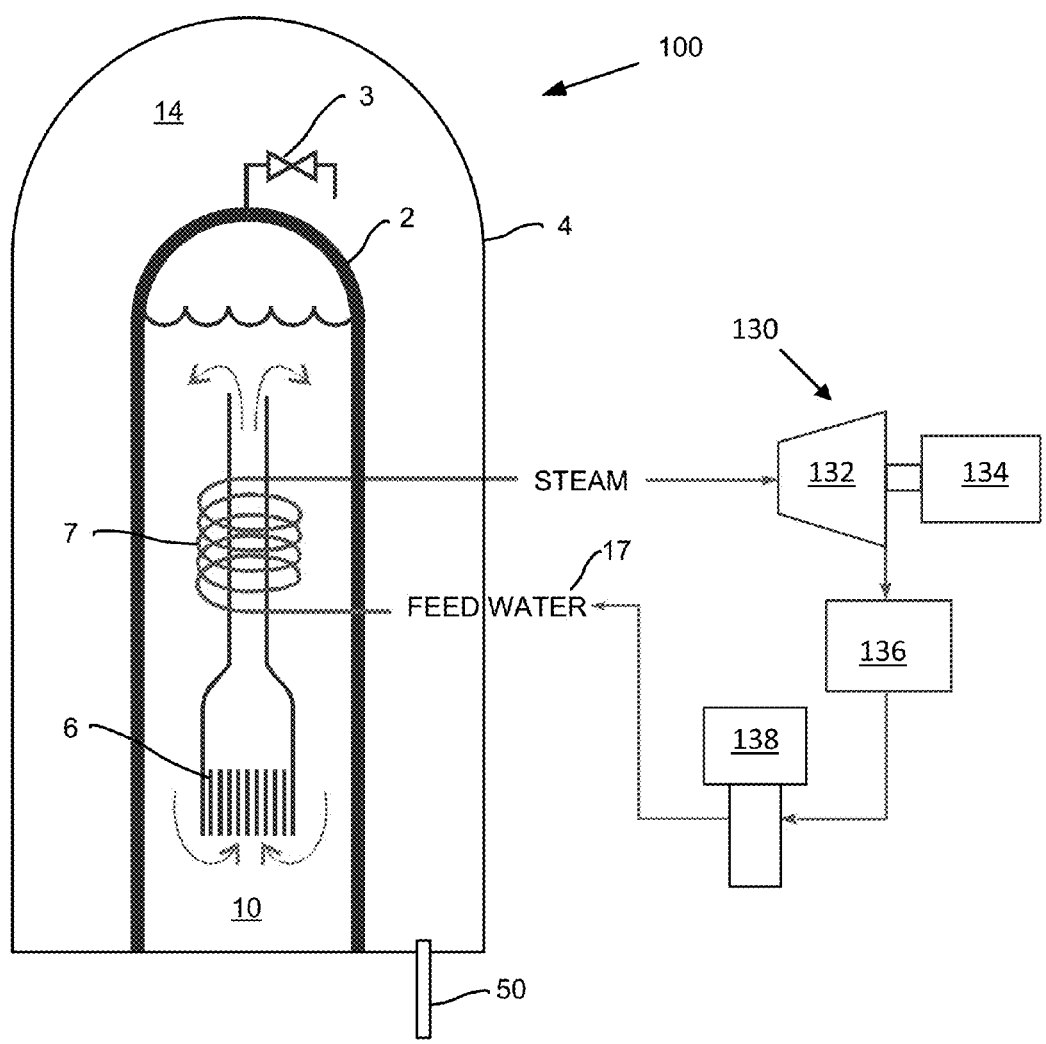
FIG. 1 illustrates an example reactor module comprising a containment vessel with a drain.

FIG. 1 illustrates an example nuclear power system including a reactor module 100 with a drain 50. The reactor module 100 may comprise a reactor core 6 surrounded by a reactor vessel 2. Primary coolant 10, such as water, housed in reactor vessel 2 surrounds and may be heated by reactor core 6 during operation of reactor module 100. Additionally, reactor vessel 2 may be surrounded by a containment vessel 4.

During an overpressure event, a valve 3 or vent may be configured to vent steam from reactor vessel 2 into a containment region 14 located between reactor vessel 2 and containment vessel 4. Containment vessel 4 may be configured so that the primary coolant 10 contained within, or released from, reactor vessel 2 is not allowed to escape into the surrounding environment outside of reactor module 100. In some examples, reactor vessel 2 may be at least partially surrounded in a partial vacuum. The partial vacuum in containment region 14 may be configured to provide thermal insulation for reactor vessel 2.

Secondary coolant 17, or feedwater, may be circulated through a heat exchanger 7 to produce steam, which may in turn be used to generate electricity with a turbine 132 and a generator 134 of a secondary coolant system 130. The secondary coolant 17 may pass through heat exchanger 7 and become superheated due to a thermal heat transfer between secondary coolant 17 and primary coolant 10. Additionally, the secondary cooling system 130 may include a condenser 136 and a pump 138. In some examples, the secondary coolant 17 is always kept isolated from the primary coolant 10 in reactor vessel 2, such that the two coolants 10, 17 are not allowed to mix or come into direct contact with each other.

As discussed above, containment region 14 may be evacuated or partially evacuated during certain operations of power module 100, such as during the generation of power and/or electricity. However, during other operations, such as refueling, containment region 14 may be at least partially filled with a liquid, such as water. In some examples, at least a portion of containment vessel 4 may be surrounded and/or submerged in a pool of water. The pool of water at least partially surrounding reactor module 100 may be housed in a containment building. During the refueling operation, containment vessel 4 may be flooded or partially flooded with water from the surrounding pool of water or other type of holding tank. Both the primary coolant 10 and the secondary coolant 17 may be kept isolated from the water used to flood the containment region 14 during the refueling operation.

After the completion of the refueling operation, containment vessel 4 may be bolted back together, or otherwise closed to provide a water tight seal. The water entrained in containment region 14 may allow for conductive and convective heat transfer from reactor vessel 2 to the pool of water during and/or after the refueling operation.

In preparation for a startup operation of reactor module 100, the drain 50 may be configured to remove any liquid in containment region 14. In some examples, drain 50 may be fluidly connected to a pump. The pump may be configured to provide suction for removing the liquid from containment region 14.

Figure 2:
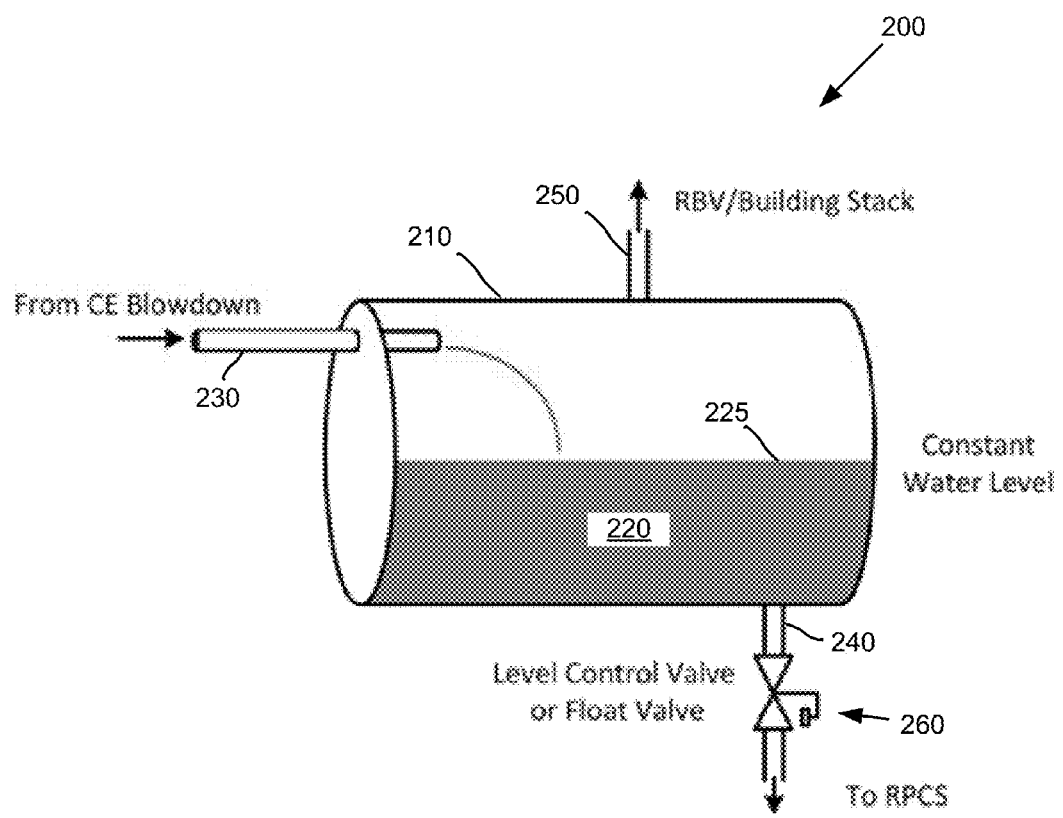
FIG. 2 illustrates an example system for draining a vessel.

FIG. 2 illustrates an example system 200 for draining a vessel, such as a containment vessel for a reactor module.

System 200 may comprise a fluid separation tank 210 operatively connected to a drain inlet 230. Drain inlet 230 may be configured to fluidly couple fluid separation tank 210 to the vessel being drained. For example, liquid being drained from the vessel may be transferred by drain inlet 230 into fluid separation tank 210 as liquid 220.

Liquid 220 may be housed in fluid separation tank 210 at a substantially constant fluid level 225. A first drain outlet 240 may be configured to release the liquid 220 out of fluid separation tank 210. First drain outlet 240 may fluidly couple fluid separation tank 210 with a reactor pressure containment system. In some examples, liquid 220 released out first drain outlet 240 may be stored in a holding tank or a pool of water.

A fluid level control device 260 may be configured to maintain the liquid 220 housed within fluid separation tank 210 at the constant fluid level 225. For example, as additional liquid 220 is drained from the vessel into fluid separation tank 210, fluid level control device 260 may be configured to allow substantially the same amount of the additional liquid to be released out of first drain outlet 240. In some examples, fluid level control device 260 may comprise a fluid level gauge, a fluid level sensor, a float valve, other types of flow control devices, or any combination thereof. Additionally, fluid level control device 260 may comprise and/or be operable with instruments or devices which may be configured to maintain the constant fluid level 225 of liquid 220 based, at least in part, on a pressure differential within fluid separation tank 210. First drain outlet 240 may be located at or near the bottom of fluid separation tank 210.

Additionally, system 200 may comprise a second drain outlet 250 or air vent. Second drain outlet 250 may be located at or near the top of fluid separation tank 210. In some examples, second drain outlet 250 may be configured to release air, gas, and/or vapor contained within fluid separation tank 210. Second drain outlet 250 may couple fluid separation tank 210 with an exhaust system or exhaust vent. In some examples, second drain outlet 250 may couple fluid separation tank 210 with a reactor building exhaust stack. Any air, gas, and/or vapor which enters fluid separation tank 210 from drain inlet 230 may exit second drain outlet 250. Accordingly, fluid separation tank 210 may be configured to separate the liquid 220 from the air, gas, and/or vapor via the first drain outlet 240 and the second drain outlet 250, respectively.

Figure 3:
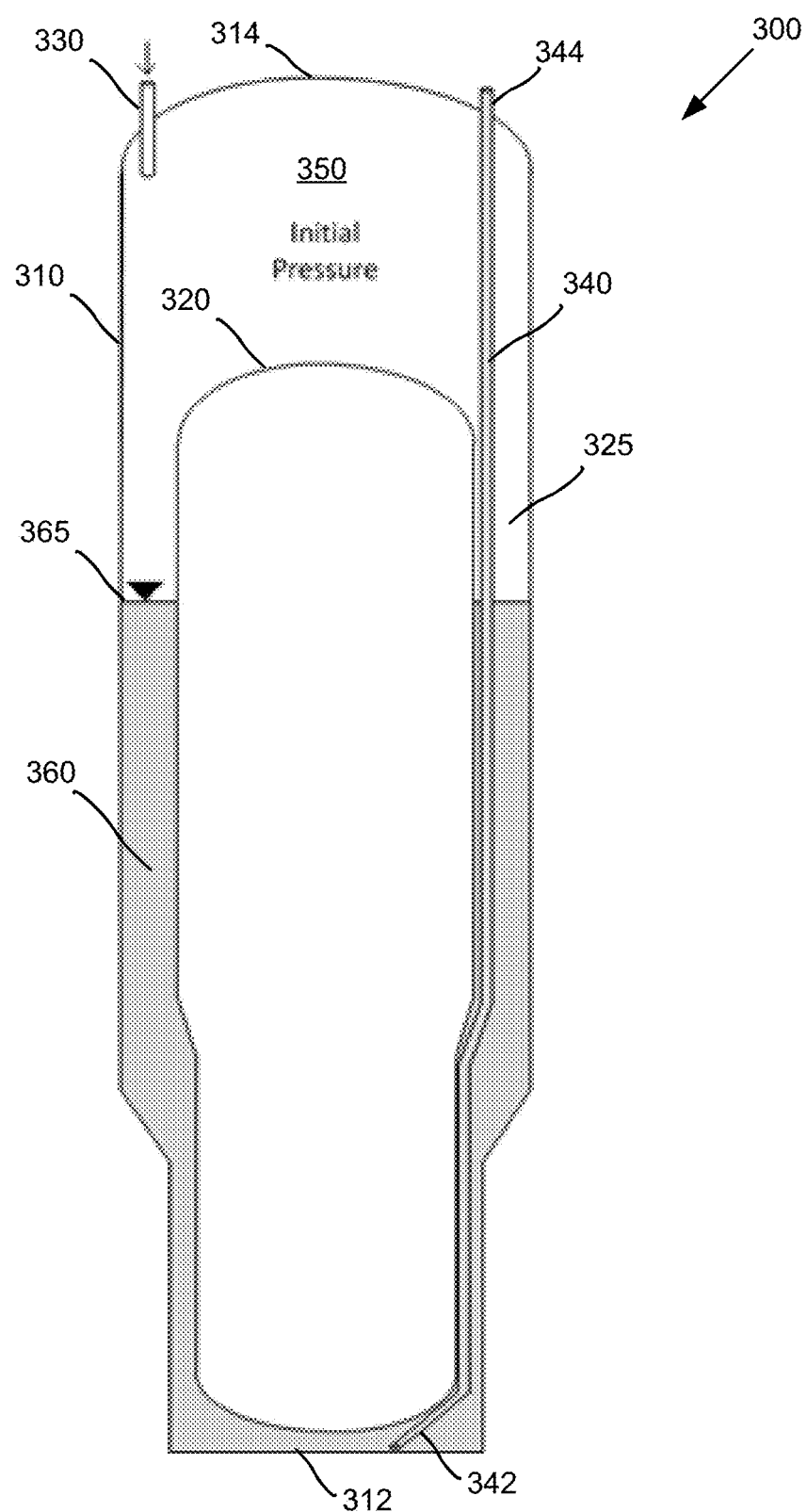
FIG. 3 illustrates an example containment vessel drain system.

FIG. 3 illustrates an example containment vessel drain system 300. A containment vessel 310 at least partially surrounding a reactor vessel 320 may comprise a containment region 350 housing a liquid 360. Liquid 360 may at least partially surround reactor vessel 320 about an annular region 325 located between reactor vessel 320 and containment vessel 310. Containment region 350 may be associated with an initial pressure while the surface of liquid 360 is at an elevation 365 within the annular region 325. Elevation 365 may be greater than 50 feet. In some examples elevation 365 may be somewhere between 70 and 100 feet. In still other examples, elevation 365 may be less than 50 feet or greater than 100 feet.

Containment vessel 310 may comprise a lower vessel head 312 and an upper vessel head 314. In some examples, lower vessel head 312 may comprise a sump. The liquid 360 may be understood as filling the lower vessel head 312. A drain pipe 340 may comprise a first end 342 located at or near the bottom of lower vessel head 312 and/or in the sump. Additionally, drain pipe 340 may comprise a second end 344 located at or near upper vessel head 314. In some examples, the second end 344 of drain pipe 340 may penetrate through the upper vessel head 314 of containment vessel 310.

An inlet 330 may be configured to transfer air and/or gas into containment region 350. Inlet 330 may couple containment vessel 310 with an air compressor or other type of gas compression device that may be configured to force the air and/or gas into containment vessel 310. Air and/or gas released into containment vessel 310 may operate to increase the initial pressure associated with containment region 350.

Figure 4:
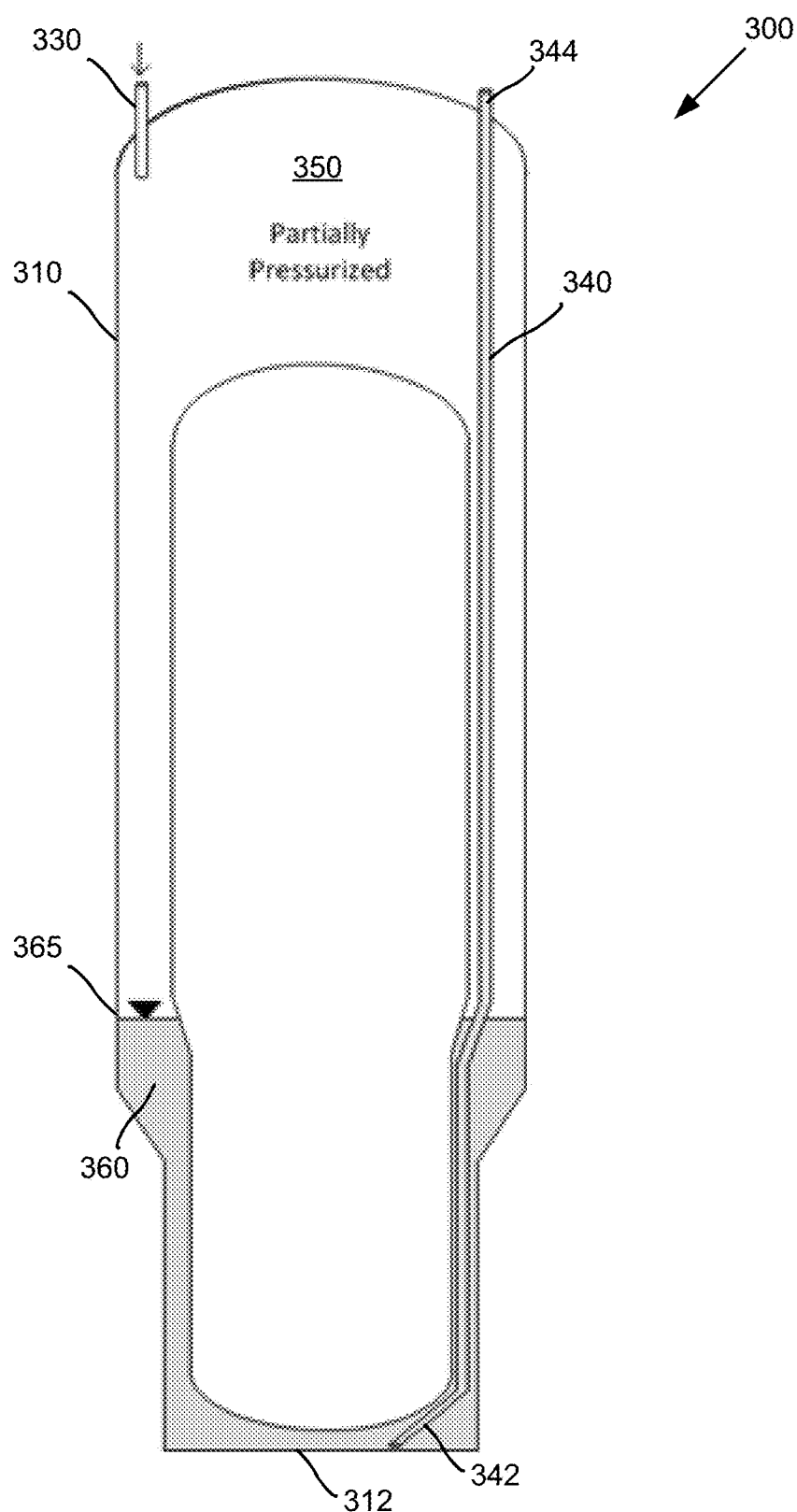
FIG. 4 illustrates the example containment vessel drain system of FIG. 3 in a partially drained condition.

FIG. 4 illustrates the example containment vessel drain system 300 of FIG. 3 in a partially drained condition. As the initial pressure within containment region 350 increases due to the insertion of additional air and/or gas via inlet 330, liquid 360 contained within containment vessel 310 may be forced into the first end 342 of drain pipe 340 and expelled out of the containment vessel 310 via the second end 344 of drain pipe 340. Additionally, the pressure within containment region 350 may continued to increase, and the elevation 365 of liquid 360 may drop down towards the bottom of lower vessel head 312, while still remaining above the first end 342 of drain pipe 340.

Figure 5:
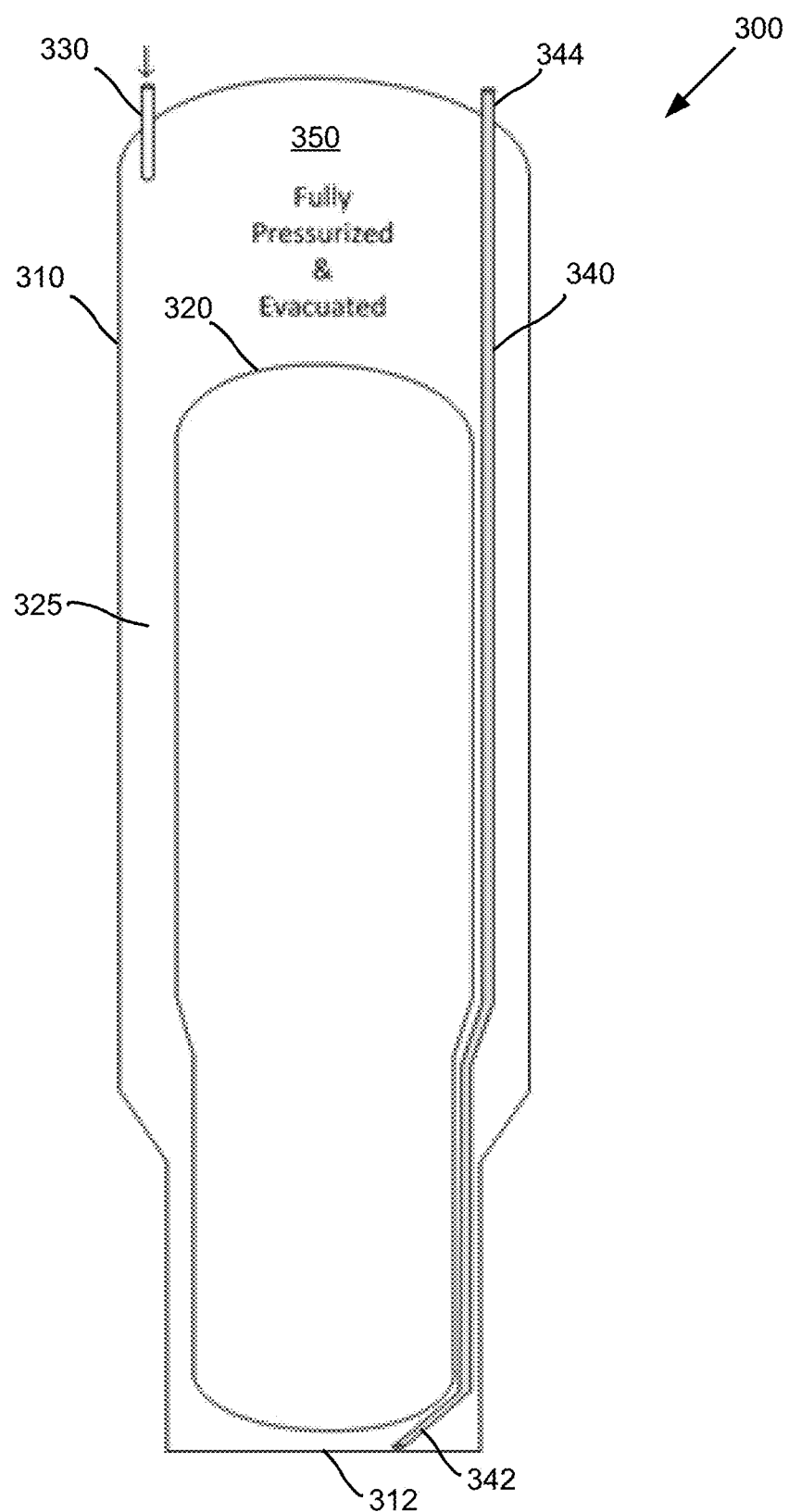
FIG. 5 illustrates the example containment vessel drain system of FIG. 3 in a fully drained condition.

FIG. 5 illustrates the example containment vessel drain system 300 of FIG. 3 in a fully drained condition. In the fully drained condition, the liquid 360 (FIG. 3) may be completely or substantially completely removed from within containment vessel 310. Similarly, the entire outer surface of reactor vessel 320, including annular region 325, may be substantially dry. Containment region 350 may be understood as being fully pressurized. The pressure within containment region 350 may be greater than 40 psia. In some examples, the pressure within containment region 350 may be approximately 70 psia. The pressure within containment region 350 may vary depending on the physical design of the system, such as the length and diameter of the pipes, the elevation, and/or other design variables. Additionally, one or both of first end 342 and second end 344 of drain pipe 340 may be configured to prohibit the reentry of liquid into containment vessel 310. A one-way valve may be configured to restrict the direction or flow of the liquid.

In some examples, containment vessel drain system 300 may be configured to release pressurized air and/or gas out of drain pipe 340. The air and/or gas may be released after the liquid has been removed from containment region 350. The liquid, air, and/or gas which is released out of containment vessel 310 may be transferred to a fluid separation system, such as the fluid separation tank 210 described with respect to the example system 200 of FIG. 2.

Following the release of the air via drain pipe 340, the pressure within containment region 350 may return to the initial pressure described with respect to the operating condition described at FIG. 3. Inlet 330 may be connected to a source of service air. In other examples, containment region 350 may be further evacuated of air and/or gas in order to create a vacuum or a partial vacuum that may substantially surround reactor vessel 320 after the liquid has been removed. A pump attached to inlet 330, or some other system for removing the air and/or gas from containment region 350, may be configured to create the partial vacuum. In some examples, the evacuated containment region may be created after a refueling operation and before a reactor startup operation.

Figure 6:
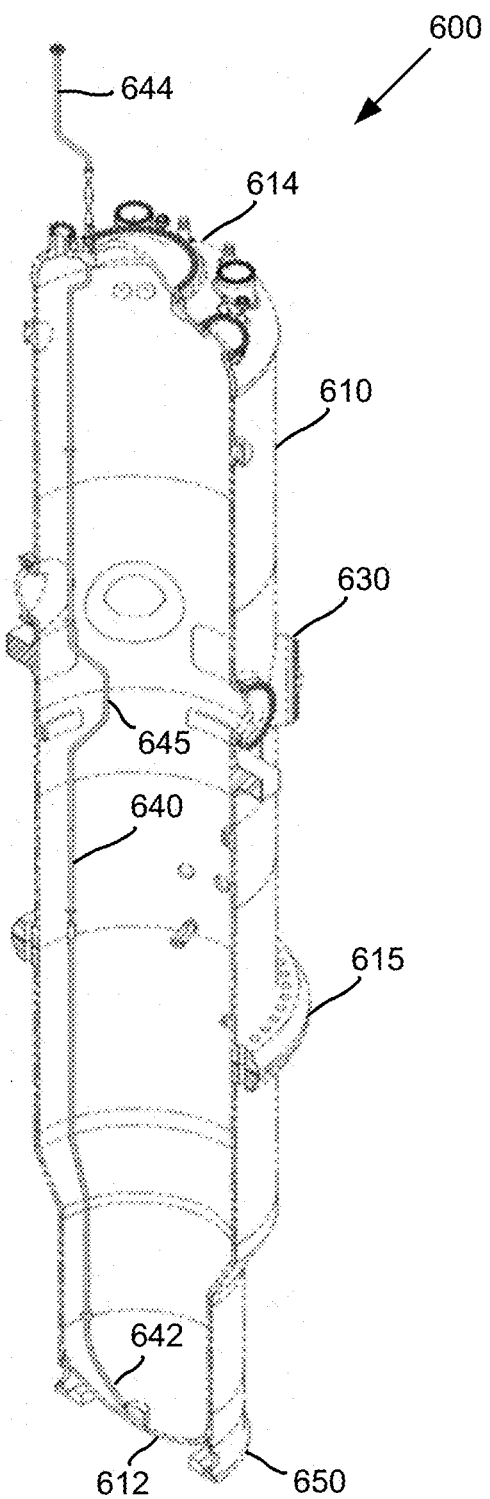
FIG. 6 illustrates example drain system 600 for a reactor module.

FIG. 6 illustrates an example drain system 600 for a reactor module. The reactor module may comprise a containment vessel 610 comprising a lower head 612 and an upper head 614. In some examples, one or both of lower head 612 and upper head 614 may be removably attached to containment vessel 610, such as by a containment flange 615. Additionally, containment vessel 610 may comprise a base support 650 that is configured to support the weight of the reactor module on the floor, ground, and/or support surface of a containment building or reactor bay.

Drain system 600 may comprise a drain pipe 640 including a first end 642 and a second end 644. Similar to that described with respect to the drain pipe 340 of FIGS. 3-5, first end 642 of drain pipe 640 may be located at or near the bottom of lower head 612. Additionally, second end 644 of drain pipe 640 may be located at or near upper head 614. In some examples, the reactor module may not include any penetrations through the lower head 612 that could otherwise be used to drain any liquid contained within containment vessel 610. Rather, second end 644 of drain pipe may penetrate and/or pass through the upper head 614 to provide a passageway for any liquid and/or gas to be released and/or expelled out containment vessel 610.

Additionally, the containment module may comprise one more plenum 630 associated with a secondary cooling system. In some examples, an intermediate portion 645 of drain pipe 640 may be configured to pass around one or more of the plenum 630 and/or a portion of secondary coolant tube bundles that may be contained within containment vessel 610.

Containment vessel 610 may be configured to be flooded with liquid or water. Additionally, drain system 600 may be configured to remove the water from within containment vessel 610. However, the reactor module may be designed without any pumps being contained within containment vessel 610. Additionally, the use of a pump to provide the motive force to lift water from the bottom of containment vessel 610 could create a suction pressure which is below the vapor pressure of the water. The suction pressure could in turn create a vapor lock or cause the pump to cavitate due to lack of Net Positive Suction Head (NPSH) available.

To increase NPSH within containment vessel 610, air pressure may be applied to containment vessel 610 to meet the required NPSH. For example, an air compression system may be used to inject or force air into containment vessel 610 to facilitate removing the water via drain system 600. The air compression system may be located outside of, or external to, containment vessel 610. The air pressure added to containment vessel 610 during the draining operation may be in excess of 40 psia, or some other pressure depending on the size of containment vessel 610 and/or the amount of water contained therein, in addition to the length, diameter, and/or elevation of any connecting pipes.

Drain system 600 may comprise one or more Containment Flooding and Drain System (CFDS) pumps operatively connected to the second end 644 of drain pipe 640. The one or more CFDS pumps may operate in conjunction with the air compression system to remove the water from containment vessel 610. In some examples, an air compression system may be configured to create sufficient pressure to reliably operate one or more pumps, such as the CFDS pumps, configured to provide a suction force that draws the liquid from containment vessel 610 into drain pipe 640.

Following the completion of containment draining, the air and/or gas injected into containment vessel 610 may be at a relatively high pressure. In some examples, the air pressure within containment vessel 610 may be somewhere between approximately 40 to 120 psia. If the air and/or gas is released through the CFDS system, the air and/or gas may follow the same path the liquid took. In some examples, the CFDS system may be configured to release the liquid into a reactor cooling pool and/or into a reactor cooling system.

The reactor cooling pool may comprise an open pool of water within the containment building. Rapidly expanding air released into the cooling pool may cause a sudden increase in sound pressure levels in the reactor building due to the volume and pressure difference between containment vessel 610 and the reactor building atmosphere.

Figure 7:
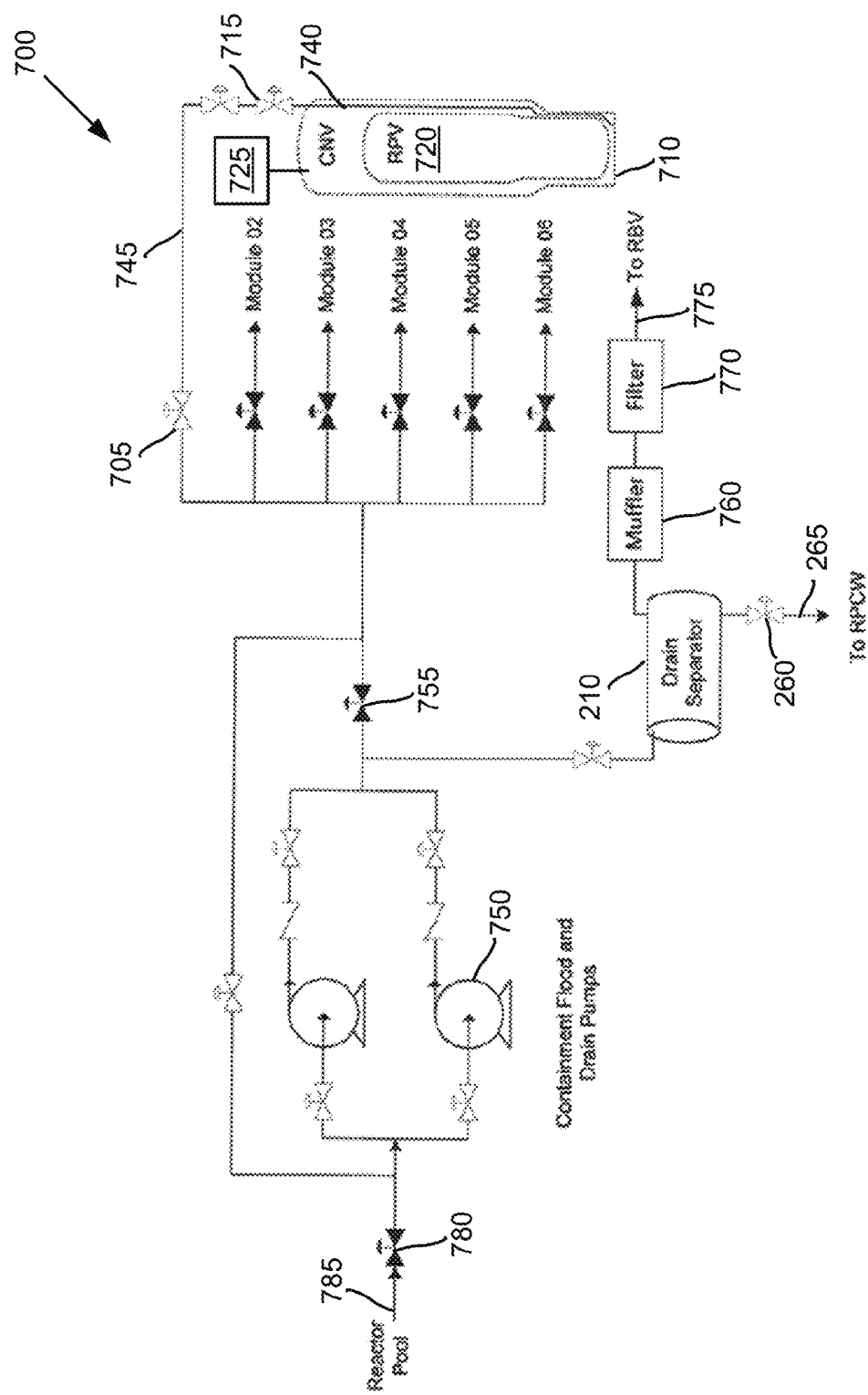
FIG. 7 illustrates a simplified fluid circuit for an example containment vessel drain system.

FIG. 7 illustrates a simplified fluid circuit for an example containment vessel drain system 700. Containment vessel drain system 700 may be configured to controllably release liquid, air, and/or gas contained within a containment vessel 710. In some examples, containment vessel 710 may at least partially surround a reactor vessel 720, similar to one or more of the systems described at FIGS. 3-6. Additionally, a drain pipe 740 may be configured to extract liquid and/or release air from containment vessel 710. Drain pipe 740 may be fluidly coupled to containment vessel 710 that is partially filled with a liquid. In some examples, a drain inlet of drain pipe 740 may be located below a surface of the liquid, in a lower portion of containment vessel 710. Additionally, a gaseous volume may be located above the surface of the liquid. The gaseous volume may be pressurized.

One or more drain valves 715 may be configured to regulate, restrict, prohibit, limit, or otherwise control the flow of liquid and/or air in at least one direction through the fluid circuit. A drain line 745 and one or more drain line valves 705 may fluidly connect drain pipe 740 to one or more pumps 750. The one or more pumps 750 may be configured to provide a suction force that draws liquid from containment vessel 710 into drain pipe 740. In some examples, the one or more pumps 750 may be located outside of containment vessel 710. Additionally, the one or more pumps 750 may be configured to draw water from a cooling pool 785 located outside of containment vessel 710. The liquid partially filling containment vessel 710 may comprise the water drawn from the cooling pool.

Drain line 745 may operate to fluidly connect drain pipe 740 to a fluid separation system, such as a system including fluid separation container 210 and fluid level control device 260 as described at FIG. 2. Fluid separation container 210 may be located outside of containment vessel 710. The fluid separation system may be configured to separate liquid from the gaseous volume that enters drain pipe 740 after the surface of the liquid falls below the drain inlet.

Drain line valves 705 may be interconnected to allow liquid and/or air to be selectively drained from a plurality of reactor modules operatively connected to the containment vessel drain system 700. Accordingly, pumps 750 and/or fluid separation container 210 may be configured to operate as one or more shared system components for the plurality of reactor modules. In some examples, six or more reactor modules may be connected to the fluid circuit and/or to one or more of the shared components.

Additionally, containment vessel drain system 700 may comprise one or more air compression systems 725. Compression system 725 may be operatively coupled to containment vessel 710, and may comprise an inlet located in an upper portion of containment vessel 710. Air and/or gas may be inserted through the pressure inlet into containment vessel 710 by compression system 725 in combination with, or followed by, the removal of liquid through drain pipe 740. The air and/or gas may form a gaseous volume that is used to push the liquid out of containment vessel 710 and into drain pipe 740. The gaseous volume may form a pressurized region above the surface of the liquid, and the pressurized region may operate to apply a surface pressure on the liquid.

In some examples, liquid may be transferred from containment vessel 710 to fluid separation tank 210 in response to both the suction force provided by the one or more pumps 750 and the pressurized gas inserted into containment vessel 710 by compression system 725. Depending on the size of containment vessel 710 and/or the amount of liquid contained therein, it may take several hours to clear the liquid from containment vessel 710. In some examples, the liquid may be removed from containment vessel 710 at a flow rate of approximately 100 gallons per minute.

Liquid that is removed from containment vessel 710 may be discharged in a relatively large holding tank or into a cooling pool 785. A cooling tank valve 780 may be configured to regulate, restrict, prohibit, limit, or otherwise control the flow of liquid and/or air in one or more directions through the fluid circuit. In some examples, in addition to pulling and discharging the liquid drawn from containment vessel 710 into cooling pool 785, pumps 750 may be configured to draw water from cooling pool 785 in order to fill containment vessel 710 with water prior to a refueling operation.

One or more circuit valves 755 may be configured to selectively regulate, restrict, prohibit, limit, or otherwise control the direction of flow of liquid and/or air through the circuit. In some examples, the one or more circuit valves 755 may be configured to allow water pumped from cooling pool 785 to be transferred into containment vessel 710. Additionally, the one or more circuit valves 755 may be configured to allow water and/or air housed in containment vessel 710 to be transferred to the separation tank 210.

Fluid separation tank 210 may be at least partially filled with a volume of the liquid that is forced into the drain inlet of drain pipe 740 at a flow rate. Fluid level device 260 may be configured to maintain the volume of liquid within fluid separation tank 210 by discharging the liquid from fluid separation tank 210 at approximately the same flow rate that the liquid is forced into the drain inlet.

Water that is transferred to fluid separation tank 210 may be discharged or released into a relatively large holding tank 265 or cooling pool. In some examples, holding tank 265 and cooling pool 785 may comprise the same body of water and/or be fluidly connected to each other. In other examples, one or both of the holding tank 265 and cooling pool 785 may comprise a suppression pool.

Fluid level control device 260 may be configured to control the level of water in fluid separation tank 210 and/or control the rate of flow of water into holding tank 265. In some examples, fluid level control device 260 may be configured to identify a pressure differential within fluid separation tank 210. In response to the identification of the pressure differential, fluid level control device 260 may be configured to prohibit any further discharge of the liquid from fluid separation tank 210.

Once the water level in containment vessel 710 and/or in fluid separation tank 210 is low enough, pressurized air and/or gas in containment vessel 210 may be released into the drain line 745 and transferred to fluid separation tank 210. The volume of liquid contained within fluid separation tank 210 may operate to prohibit the pressurized gas from being discharged into holding tank 265.

Fluid separation tank 210 may comprise an air vent. The air vent may be configured to discharge the pressurized gas that is released into the drain inlet of drain pipe 740. The air and/or gas may then be diverted into one or more noise dampers, noise filters, particulate filters, noise silencers, and/or noise diffusers, such as a muffler 760 and/or a filter 770, connected to fluid separation tank 210. Muffler 760 and/or filter 770 may be configured to reduce the decibel level, reduce radioactive particulates associated with the released air, and/or otherwise mitigate or diminish the acoustic effects of the released air and/or gas while controlling the depressurization of containment vessel 710.

In some examples, muffler 760 and/or filter 770 may be configured to restrict or limit the rate of release of the pressurized gas in order to reduce the rate of expansion of the discharged gas or otherwise mitigate or reduce the acoustical response of the discharged gas. Rather than discharging the pressurized gas in a large acoustic event, the pressurized gas may be controllably released over a period of time ranging from several minutes to one or more hours, depending on the rate of release.

In some examples, a lower water level and/or pressure differential inside fluid separation tank 210 may be configured to cause fluid level control device 260 to shut. The water inside fluid separation tank 210 may operate to provide a margin to allow for a drain valve closure time. Shutting fluid level control device 260 may seal the path to holding tank 265 and/or to the reactor building atmosphere, and instead divert the pressurized air and/or gas to muffler 760 and/or filter 770. The air and/or gas may be ultimately discharged out of a reactor building stack or external exhaust. In some examples, the air and/or gas may be discharged into the reactor building if the noise level is acceptably low to any nearby plant operators.

One or more of the fluid separation tank 210, muffler 760 and/or filter 770 may be combined with a Containment Evacuation System (CES), a Reactor Pressure Containment System (RPCS) or a Heating, Ventilation and Air Conditioning (HVAC) system associated with a reactor module and/or a reactor building.

Figure 8:
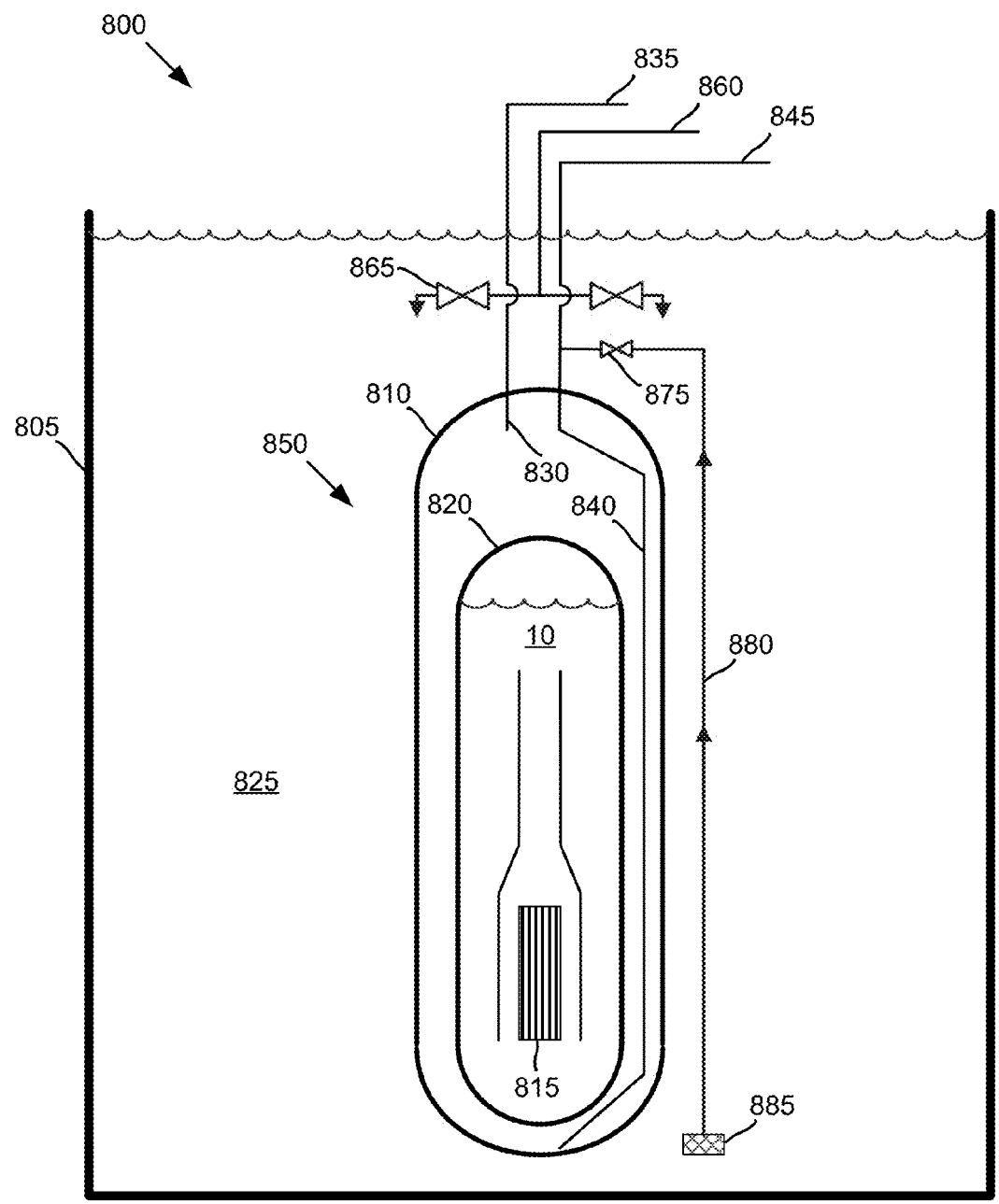
FIG. 8 illustrates an example containment vessel drain system for a reactor module at least partially submerged in a pool of water.

FIG. 8 illustrates an example containment vessel drain system 800 for a reactor module 850 at least partially submerged in a pool of water 825. The pool of water 825 may be contained in a reactor building 805 and/or a reactor bay that houses reactor module 850. In some examples, the pool of water 825 and/or reactor module 850 may be located below ground level. Reactor module 850 may comprise a containment vessel 810 and a reactor vessel 820 housed within the containment vessel 810. One or both of containment vessel 810 and reactor vessel 820 may be manufactured out of metal, such as steel or a steel alloy. The walls of reactor building 805 may include steel-reinforced concrete.

A means for removing liquid from containment vessel 810 filled with both liquid and a pressurized gas may comprise drain pipe 840 and/or one or more other devices or systems connected to drain pipe 840 via a hydraulic line 845. For example, hydraulic line 845 may be configured to operatively connect drain pipe 840 to one or more pumps, such as pumps 750 of FIG. 7. The pressurized gas may enter the means for removing after the liquid is substantially removed from the containment vessel.

Additionally, drain pipe 840 may be connected to a means for separating the liquid from the pressurized gas after both the liquid and at least a portion of the pressurized gas have been removed from the containment vessel. The means for separating may comprise one or more systems or devices described herein, such as system 200 (FIG. 2) including fluid separation tank 210 and fluid level control device 260, other systems for separating liquid from gas, or any combination thereof.

Still further, drain pipe 840 may be connected to a means for diminishing acoustic properties of the pressurized gas after it has been separated from the liquid. The means for diminishing may comprise one or more one or more systems or devices described herein, such as noise dampers, noise filters, noise silencers, and/or noise diffusers, muffler 760 and/or filter 770 (FIG. 7), other systems for diminishing acoustic properties, or any combination thereof.

In some examples, a means for flooding the containment vessel may comprise an inlet 885 located within the pool of water 825, together with hydraulic line 880 and one or more valves, such as valve 875. Valve 875 may comprise a one-way valve which can be opened to draw in water through inlet 885. Additionally, hydraulic line 880 may be connected to drain pipe 840, such that water drawn into inlet 885 may be released into containment vessel 810. In still other examples, the means for flooding may comprise one or more pumps and/or holding tanks which may be configured to provide the water or other type of liquid that is released into the containment vessel 810.

Liquid separated from the gas by the means for separating may be discharged by one or more discharge devices 865 connected to a hydraulic line 860. The discharge devices 865 may be located in the pool of water 825. In some examples, the liquid that is discharged by the one or more discharge devices 865 may comprise water that was originally drawn from the pool of water 825 through inlet 885 and used to flood containment vessel 810.

In some examples, hydraulic line 860, hydraulic line 880, inlet 885, one or more valves 875, and/or discharge devices 865 may comprise components used for an emergency core cooling system. In still other examples, one or more of hydraulic line 860, hydraulic line 880, inlet 885, one or more valves 875, and discharge devices 865 may comprise components of a system for providing an auxiliary source of water to a secondary coolant system.

A means for pressurizing containment vessel 810 with a pressurized gas may comprise pressurizer pipe 830 and/or one or more other devices or systems connected to pressurizer pipe 830 via a hydraulic line 835. For example, hydraulic line 835 may be configured to operatively connect pressurizer pipe 830 to one or more compression systems, such as compression system 725 of FIG. 7. Additionally, pressurizer pipe 830 and/or hydraulic line 835 may be operatively connected to an air evacuation system.

In some examples, all of the functionality described for the means disclosed herein may be performed without the primary coolant 10 ever being allowed to leave reactor vessel 820.

Additionally, during normal operation of reactor module 850 while a reactor core 815 is generating power, the containment vessel 810 may be internally dry and/or substantially evacuated of all liquid and gases.

Figure 9:
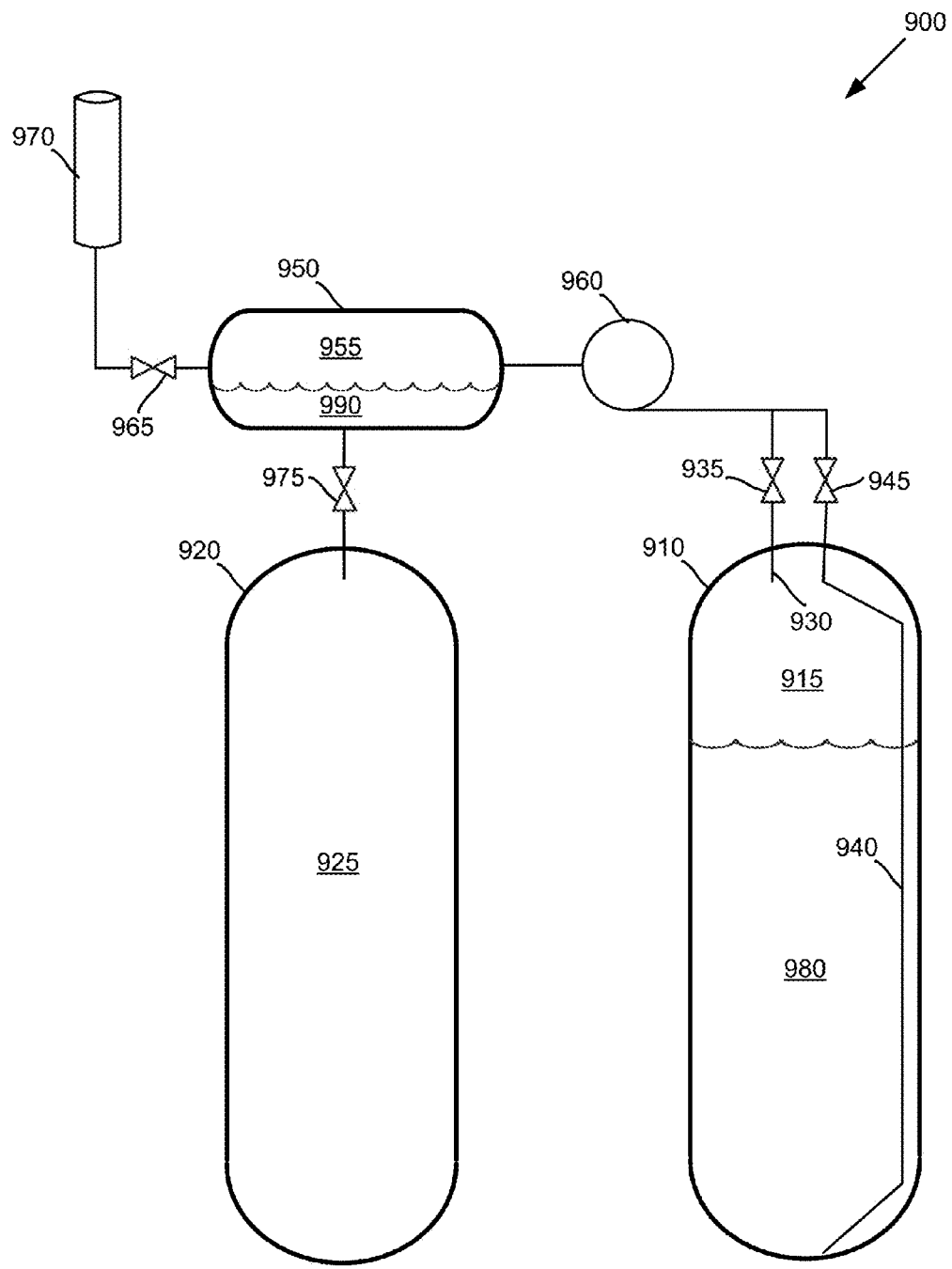
FIG. 9 illustrates yet another example containment vessel drain system.

FIG. 9 illustrates yet another example containment vessel drain system 900 comprising a containment vessel 910 at least partially filled with a liquid 980. A drain pipe 940 inserted into containment vessel 910 may be configured to transfer the liquid 980 into a holding tank 920. In some examples, holding tank 920 may be similarly sized and/or able to hold a similar amount of liquid as containment vessel 910.

In addition to liquid 980, containment vessel 910 may be configured to contain a gaseous region 915. Gaseous region 915 may comprise air other types of gases and/or vapor. In some examples, gaseous region 915 may be pressurized. A gas inlet 930 may be operatively connected to and/or penetrate into containment vessel 910. Gas inlet 930 may be configured to insert, release, or inject pressurized gas into containment vessel 910.

A first containment control device 945, such as a valve or other type of flow control device, may be configured to control the flow of liquid into or out of containment vessel 910. Similarly, a second containment control device 935 may be configured to control the flow of gas into or out of containment vessel 910. One or both of first containment control device 945 and second containment control device 935 may be operatively connected to a fluid separation device 950. In some examples, fluid separation device 950 may be configured to separate gas from liquid, similar to the system 200 of FIG. 2.

One or more pumps such as pump 960 may be configured to provide a suction force which may draw the liquid 980 out of container vessel 910 into fluid separation device 950. Liquid 980 drawn from containment vessel 910 may form a pool of liquid 990 within fluid separation device 950. Fluid separation device 950 may be configured as a temporary holding tank to transfer the liquid 980 into holding tank 920. A holding tank control device 975, such as a valve or other type of flow control device, may be configured to control the flow of liquid into or out of holding tank 920.

Additionally, fluid separation device 950 may be operatively connected to an acoustic sound reduction device 970, such as a noise damper, a noise filter, a noise silencer, a noise diffuser, a muffler, a noise filter, other types of acoustic control devices, or any combination thereof. An acoustic control device 965, such as a valve or other type of flow control device, may be configured to control the flow of air, gas, and/or vapor from fluid separation device 950 to acoustic sound reduction device 970.

In some examples, a containment region 925 associated with holding tank 920 may be held at a vacuum or a partial vacuum. The vacuum may be used to create a suction force that draws the liquid 980 through drain pipe 940 and into holding tank 920. In other examples, containment region 925 may initially be pressurized. Pressurized gas within holding tank 920 may be injected into the gaseous region 915 of containment vessel 910 prior to, or contemporaneously with, withdrawing liquid 980. In still other examples, one or more pumps may be used to pressurize the gaseous region 915 of containment vessel 910. For example, the operation of pump 960 may effectively be reversed to force gas into containment vessel 910 via second containment control device 935.

Figure 10:
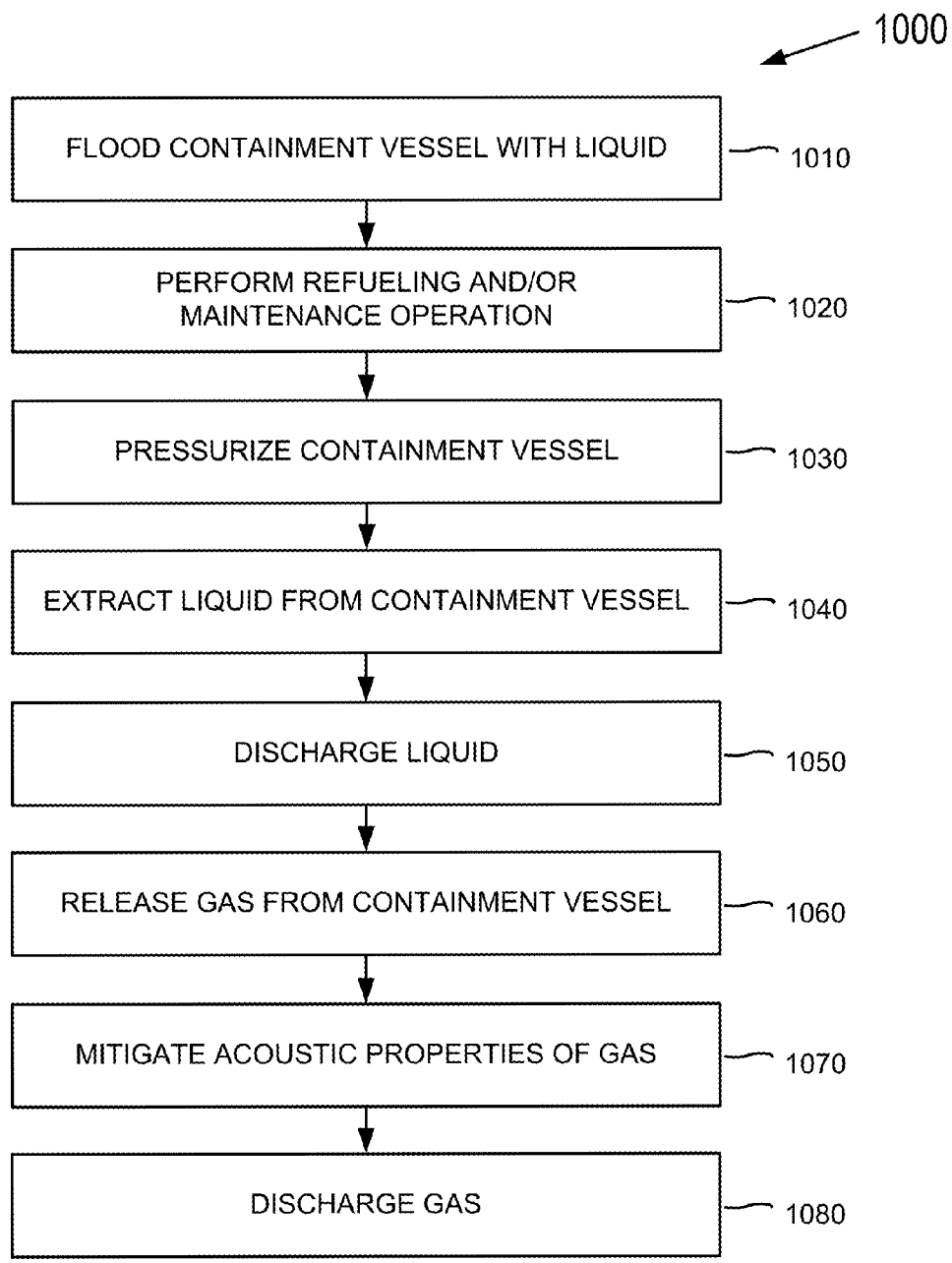
FIG. 10 illustrates an example process for draining a containment vessel.

FIG. 10 illustrates an example process 1000 for draining a containment vessel. At operation 1010, a containment vessel in a reactor module may be flooded with a liquid, such as water.

At operation 1020, a refueling and/or maintenance operation may be performed on the reactor module.

At operation 1030, the containment vessel may be pressurized with a gas, such as air. In some examples, the containment vessel may be pressurized following the completion of operation 1020.

At operation 1040, the liquid may be extracted, withdrawn, siphoned, and/or otherwise removed from the containment vessel. In some examples, the pressure associated with the pressurized gas may be sufficient to force the liquid into and through the drain pipe. In other examples, a suction force provided by one or more pumps may augment the pressurized air to remove the liquid from the containment vessel.

At operation 1050, the liquid removed from the containment vessel may be discharged into a holding tank, a cooling pool, or a suppression pool.

At operation 1060, the pressurized gas may be released from the containment vessel. In some examples, the pressurized gas may be released following the completion of operation 1050, or after substantially all of the liquid has been removed from the containment vessel.

At operation 1070, the pressurized gas may be processed and/or operated on in one or acoustic devices such as a muffler or a noise filter.

At operation 1080, the pressurized gas may be discharged with mitigated acoustic properties. In some examples, the rate of discharge of the pressurized gas may be controlled to reduce the rate of expansion of the discharged gas or otherwise reduce the acoustical response of the discharged gas.

In addition to operating with a pressurized water reactor and/or a light water reactor, it should be apparent to one skilled in the art that at least some of the examples provided herein may be understood to also apply to other types of systems or liquid containment structures. For example, one or more of the examples or variations thereof may also be made operable with a boiling water reactor or certain other types of reactor designs. It should further be noted that any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A system to drain a containment vessel, the system comprising:
   a reactor vessel, contained within the containment vessel, to contain a nuclear reactor;
   a liquid to at least partially fill the containment vessel and to at least partially surround the reactor vessel about a region between the containment vessel and the reactor vessel;
   a drain inlet located in a lower portion of the containment vessel, below a surface of the liquid;
   an inlet located in an upper portion of the containment vessel;
   a source of pressurized gas to insert pressurized gas into the containment vessel through the inlet to force the liquid into the drain inlet;
   a fluid separation device, operatively connected to the drain inlet, to separate the liquid from the pressurized gas that enters the drain inlet after a surface of the liquid falls below the drain inlet in response to the pressurized gas, wherein the fluid separation device comprises a fluid separation tank at least partially filled with a volume of the liquid to maintain the volume of the liquid within the fluid separation tank by discharging the liquid from the fluid separation tank at approximately a same flow rate that the liquid is forced into the drain inlet; and
   an acoustic damping device to diminish one or more acoustic properties of the pressurized gas discharged through an air vent.

2. The system of claim 1, wherein the fluid separation device is located external to the containment vessel.

3. The system of claim 1, wherein the fluid separation device discharges the liquid into a holding tank based, at least in part, on the volume of liquid within the fluid separation tank.

4. The system of claim 1, wherein the fluid separation device comprises a fluid level control device to identify a pressure differential within the fluid separation tank and prohibits any further discharge of the liquid from the fluid separation tank based, at least in part, on the pressure differential within the fluid separation tank.

5. The system of claim 1, wherein the acoustic damping device comprises a noise muffler, a noise diffuser, a noise silencer, or a noise filter.

6. The system of claim 1, further comprising one or more pumps configured to provide a suction force that draws the liquid into the drain inlet, wherein the liquid is transferred to the fluid separation device in response to the suction force provided by the one or more pumps and the pressurized gas.

7. The system of claim 6, wherein the one or more pumps are located external to the containment vessel.

8. A fluid separation system, comprising:
   a containment vessel;
   a reactor vessel, contained within the containment vessel, to contain a nuclear reactor;
   a liquid to at least partially fill the containment vessel and to at least partially surround the reactor vessel about a region between the containment vessel and the reactor vessel;
   a drain pipe fluidly coupled to the containment vessel and located below a surface of the liquid;
   a gaseous volume above the surface of the liquid;
   one or more pumps operatively connected to the drain pipe to provide a suction force that draws the liquid from the containment vessel into the drain pipe and lowers the surface of the liquid within the containment vessel;
   a fluid separation device operatively connected to the drain pipe to separate the liquid from the gaseous volume that enters the drain pipe after the surface of the liquid falls below the drain pipe, wherein the fluid separation device comprises a fluid separation tank at least partially filled with a volume of the liquid to maintain the volume of the liquid within the fluid separation tank by discharging the liquid from the fluid separation tank at approximately a same flow rate that the liquid is forced into the drain pipe; and
   an acoustic damping device to diminish one or more acoustic properties of pressurized gas discharged by the fluid separation tank through an air vent.

9. The system of claim 8, wherein the one or more pumps are external to the containment vessel.

10. The system of claim 8, wherein the one or more pumps draw the liquid from a cooling pool external to the containment vessel.

11. The system of claim 8, further comprising:
   a compression device, operatively coupled to the containment vessel, to insert pressurized gas into the containment vessel to form the gaseous volume;
   wherein the containment vessel transfers the liquid to the fluid separation device in response to the suction force provided by the one or more pumps and the pressurized gas inserted into the containment vessel by the compression device.

12. The system of claim 11, wherein the compression device is located internal to the containment vessel.

13. The system of claim 11, wherein the compression device is located external to the containment vessel.

14. The system of claim 8, wherein the acoustic damping device reduces a rate of expansion of the gaseous volume that is discharged from the fluid separation device.

15. A fluid separation system, comprising:
   means for providing pressurized gas into a containment vessel containing a nuclear reactor;
   means for removing a liquid from the containment vessel filled with the liquid and the pressurized gas, wherein the pressurized gas enters the means for removing the liquid after the liquid is substantially removed from the containment vessel;

means for separating the liquid from the pressurized gas after both the liquid and at least a portion of the pressurized gas have been removed from the containment vessel, wherein the means for separating maintains a volume of the liquid within the means for separating by discharging the liquid at approximately a same flow rate that the liquid is provided into the containment vessel;

means for venting the pressurized gas; and means for diminishing acoustic properties of the pressurized gas after it has been separated from the liquid.

16. The system of claim 15, further comprising:

means for flooding the containment vessel with the liquid; and means for pressurizing the containment vessel with the pressurized gas.

17. A system for draining a containment vessel, the system comprising:

a drain inlet located in a lower portion of the containment vessel containing a nuclear reactor, wherein the containment vessel is at least partially filled with a liquid, and wherein the drain inlet is located below a surface of the liquid;

an inlet located in an upper portion of the containment vessel, wherein the inlet is configured to insert pressurized gas into the containment vessel to form a pressurized region above the surface of the liquid, and wherein the pressurized region operates to apply a surface pressure that lowers the surface of the liquid within the containment vessel and forces the liquid into the drain inlet; and a fluid separation device operatively connected to the drain inlet, wherein the fluid separation device is configured to separate the liquid from the pressurized gas that enters the drain inlet after the surface of the liquid falls below the drain inlet, wherein the fluid separation device comprises a fluid separation tank at least partially filled with a volume of the liquid to maintain the volume of the liquid within the fluid separation tank by discharging the liquid from the fluid separation tank at approximately a same flow rate that the liquid is forced into the drain inlet, and wherein the fluid separation tank comprises an air vent to discharge the pressurized gas that is released into the drain inlet; and an acoustic damping device to diminish one or more acoustic properties of the pressurized gas discharged through the air vent;

wherein a reactor vessel housed within the containment vessel is at least partially submerged in the liquid prior to lowering the surface of the liquid.

18. The system of claim 17, wherein the reactor vessel includes a reactor core submerged in primary coolant, and wherein the surface of the liquid is lowered in the containment vessel without removing the primary coolant from the reactor vessel.

19. A system for draining a containment vessel, the system comprising:

a drain inlet located in a lower portion of the containment vessel containing a nuclear reactor, wherein the containment vessel is at least partially filled with a liquid, and wherein the drain inlet is located below a surface of the liquid;

an inlet located in an upper portion of the containment vessel, wherein the inlet is configured to insert pressurized gas into the containment vessel to form a pressurized region above the surface of the liquid, and wherein the pressurized region operates to apply a surface pressure that lowers the surface of the liquid within the containment vessel and forces the liquid into the drain inlet;

a fluid separation device operatively connected to the drain inlet, wherein the fluid separation device is configured to separate the liquid from the pressurized gas that enters the drain inlet after the surface of the liquid falls below the drain inlet, wherein the fluid separation device maintains a volume of the liquid by discharging the liquid at approximately a same flow rate that the liquid is forced into the drain inlet, and wherein the fluid separation tank comprises an air vent to discharge the pressurized gas; and an acoustic damping device to diminish one or more acoustic properties of the pressurized gas discharged through the air vent;

wherein the drain inlet is configured to release the pressurized gas into the fluid separation device after the liquid is substantially removed from the containment vessel.

* * * * *